United States Patent
Khalil et al.

[11] Patent Number: 6,035,933
[45] Date of Patent: Mar. 14, 2000

[54] PROCESS FOR THE THERMO-HYDRAULIC CONTROL OF GAS HYDRATES

[75] Inventors: Carlos Nagib Khalil; Nelson De Oliveira Rocha; Lucia Cristina Ferreira Leite, all of Rio de Janeiro, Brazil

[73] Assignee: Petroleo Brasileiro S.A.-Petrobras, Rio de Janiero, Brazil

[21] Appl. No.: 08/995,141

[22] Filed: Dec. 19, 1997

[30] Foreign Application Priority Data

Oct. 17, 1997 [BR] Brazil ................................... 9705076

[51] Int. Cl.⁷ .......................... E21B 43/22; E21B 43/24; E21B 43/34
[52] U.S. Cl. ......................... 166/263; 137/13; 166/300; 166/302; 166/309; 166/310; 166/312; 166/357; 166/371; 166/401; 210/696; 507/90; 507/216; 507/277; 507/927; 585/950
[58] Field of Search ............................. 137/13; 166/263, 166/267, 272.6, 275, 279, 300, 302, 305.1, 309, 310, 312, 357, 371, 401, 402; 210/696; 507/90, 216, 277, 927; 585/15, 899, 950

[56] References Cited

U.S. PATENT DOCUMENTS

| | | | |
|---|---|---|---|
| 4,219,083 | 8/1980 | Richardson et al. ..................... | 166/300 |
| 4,330,037 | 5/1982 | Richardson et al. ................ | 166/300 X |
| 4,424,866 | 1/1984 | McGuire ............................. | 166/371 X |
| 4,482,016 | 11/1984 | Richardson ............................ | 166/300 |
| 4,846,277 | 7/1989 | Khalil et al. ............................ | 166/280 |
| 4,856,593 | 8/1989 | Matthews et al. ....................... | 106/310 |
| 5,076,364 | 12/1991 | Hale et al. .............................. | 166/310 |
| 5,183,581 | 2/1993 | Khalil et al. . | |
| 5,244,878 | 9/1993 | Sugier et al. ............................ | 507/90 |
| 5,420,370 | 5/1995 | Sloan, Jr. ........................... | 588/950 X |
| 5,432,292 | 7/1995 | Sloan, Jr. .................................. | 585/15 |
| 5,460,728 | 10/1995 | Klomp et al. .......................... | 210/698 |
| 5,580,391 | 12/1996 | Franco et al. ............................... | 134/5 |
| 5,639,313 | 6/1997 | Khalil ...................................... | 134/18 |
| 5,713,416 | 2/1998 | Chatterji et al. ....................... | 166/263 |
| 5,879,561 | 3/1999 | Klomp et al. .......................... | 210/698 |
| 5,891,262 | 4/1999 | Khalil et al. ........................ | 166/310 X |

OTHER PUBLICATIONS

"SGN Technology, The Environmentally Sound Solution for Organic Buildups", Petrobras/Maritima (undated).

Primary Examiner—George Suchfield
Attorney, Agent, or Firm—Sughrue, Mion, Zinn, Macpeak & Seas, PLLC

[57] ABSTRACT

A process for the thermo-hydraulic control of gas hydrates in subsea production and injection wells as well as pipelines which transport liquid or gaseous hydrocarbons is described, the process making use of a Nitrogen Generating System foamed or in solution. The control may signify the prevention of the formation of the gas hydrates or the dissolution of the gas hydrate plug already formed. Under conditions of use designed for the prevention of the formation of gas hydrates the SGN fluid prevents the thermal conditions leading to the gas hydrate plugs. Under conditions of use designed to dissolve the already formed gas hydrate plugs, the SGN fluid alters the thermo-hydraulic conditions which favor the gas hydrate plugs, so that they are dissolved and return to the water+gas phase.

12 Claims, 5 Drawing Sheets

PROCESS FOR THE THERMO-HYDRAULIC CONTROL OF GAS HYDRATES

FIELD OF THE INVENTION

The present invention relates to a process for the thermo-hydraulic control of gas hydrates with the aid of a Nitrogen Generating System (also known as "SGN", based on the Portugese "Systema Gerador de Nitrogênio"). More specifically, the present invention relates to a process for the thermo-hydraulic control of gas hydrates of any low boiling hydrocarbon stream in the presence of humidity so that the thermo-hydraulic conditions lead to the formation of such gas hydrates, the process being carried out with the aid of Nitrogen Generating System (SGN).

BACKGROUND INFORMATION

Gas hydrates are formed whenever water and hydrocarbon gases are combined under high pressure and low temperature.

Gas hydrates are crystal lattices made up of two or more constituents. The molecules of one component (always water) form a structure having relatively large cavities, which are occupied by the molecules of other constituents, these being separate gases or gaseous mixtures.

Gases which are important from the industrial as well the laboratory aspect show structures defined by the formula $X.nH_2O$ where X is the hydrate-forming molecule while the number of water molecules in the compound is n>5.67. Generally, hydrates are formed only in the presence of condensed water, that is, liquid water or ice. The water molecules linked by hydrogen bridges form a host (receiving) network around one or more species of the guest molecules. A physical encapsulation process occurs which is accompanied by weak interactions between the host-guest constituents when the guests enter the cavities of the host structure and are released therefrom under appropriate circumstances, by the collapse of the host structure.

Thus, the gaseous components within the cavities are not directly linked to the water molecules of the network. Due to geometrical reasons, such components cannot abandon the network of water molecules linked by hydrogen bridges until such network collapses.

Therefore, in the stable state, gas hydrates are always clathrate compounds of two or more components, since the components are mutually inserted via a complex mechanism. However the cohesion forces between the host and guest molecules do not suffice for forming a clathrate. Besides the cohesive forces, two basic criteria must be met in order to form a clathrate: the trend of water molecules to form a network must be satisfied, while the guest molecules must show suitable size and shape to enter the cavities of the hydrogen-bridged water network. A further requirement for forming the structure is that there should not be any chemical reaction between the guest molecules and the water molecules, that is, during crystallization, hydrolysis as well as hydration should be avoided in order to prevent a structure whose total energy would be lower than that of the clathrate.

Generally, it is considered that for the gas hydrates to occur the components or constituents should meet the following requirements: low solubility in water, sufficient volatility, homopolar character, not too large van der Waals forces, evaporation heat lower than $31{,}400$ J mol$^{-1}$ as well as boiling point lower than 60° C., the hydrate-forming component being devoid of hydrogen atoms able to yield additional hydrogen bridges. Finally, the hydrate-forming gas should not be fairly soluble in either water, as are for example $NH_3$ or HCl, or a water miscible liquid, for example $CH_3OH$.

Studies carried out in the field of gas hydrates indicate that the initial conditions for forming gas hydates are determined by the nature of the gas, the water state, the pressure and the temperature. The formation conditions are set in heterogeneous phase diagrams plotted as pressure vs. temperature.

The probability that a gas hydrate will be formed is as high as its stability. The stability degree of a gas hydrate and consequently its dissociation temperature are influenced by the molecular size and the geometric shape of the hydrate-forming components. Among the hydrocarbon hydrates, the more stable are those of propane and isobutane. The conditions for hydrate formation for a single- or multicomponent gaseous system are thus more or less altered by the presence of a third component. Generally it can be said that this effect depends on the gas composition, the density of the corresponding gas, the nature and amount of the substance which is altering the structural conditions in water, and on the pressure existing in the system. In the presence of electrolytes or polar solutes, the primary factors which act to alter the conditions of hydrate formation and dissociation are the structural variations which depend mainly on the solute pressure, temperature and composition and also on the energy variations of the interactions among molecules.

Researches has shown that any amount of electrolytes dissolved in water will lower the temperature of hydrate formation at a given pressure. In low amounts, alcohols increase the temperature of hydrate formation; however, for increasing amounts, such temperature is lowered. In this latter case it is hypothesized that structural cavities in water are partially occupied (for example, by methyl groups in the case of methanol) and thus an ordering of the hydrocarbon chains similar to that of ice is enhanced in the vicinity of the organic molecules. For higher amounts of alcohol, the clathrate-forming aggregates are broken, whereby the possibility of hydrate formation is decreased in the same way as in the case where the water structure is adversely affected by the presence of electrolytes. The inhibiting effect of electrolytes and alcohols is very important in the processes of production and transportation of natural gas, and may be extended to other processes as well.

Gas hydrates frequently occur during working out of subsea wells, mainly in deep-water wells. The gas hydrate deposits are mainly made up of petroleum gas and formation water or aqueous fluids generated by combined effects of turbulence, pressurization and cooling.

When the gas hydrate deposits are found in the production string or even in the surgency line, such deposits invariably cause the complete plugging of the production flow.

Under conditions of secondary recovery such as the method known as Water Alternating Gas (WAG) where water and gas are alternatively pumped into a reservoir through an injection well under conditions of low temperature and high pressure, the water-as mixture may form hydrates which can plug the injection well, bringing huge drawbacks to the well infectivity. It is then interesting to prevent the formation of these hydrates by heating the reservoir with the aid of the SGN of the present invention.

Also, under conditions of petroleum oil production, there are situations where the gas produced in the presence of cold water creates conditions of gas hydrate formation, which may plug the wet gas streamflow.

Still, the transportation of petroleum fluids along pipelines or lines from offshore equipments to shore facilities may generate conditions for the formation of gas hydrates, the flow of fluid throughout the pipeline or line being thus impaired.

In the natural gas industry the occurrence of gas hydrates is met on a day-by-day basis, since the thermo-hydraulic conditions for such are highly favored.

Therefore, various thermodynamic conditions are found which favor the occurrence of gas hydrates, in production as well as in the secondary recovery of oil as well as in the transportation of petroleum fluids, besides situations which can be found in the production of natural gas from petroleum reservoirs.

The usual practice to prevent gas hydrate formation is the addition to the aqueous fluid of an anti-freezing agent in amounts of 10 to 40% vol. Normally such agents are hydroxylated compounds such as primary alcohols in $C_1$–$C_4$, besides glycols. In Brazil ethyl alcohol is usually employed, with good results and relatively low cost.

U.S. Pat. No. 5,460,728 teaches a process for the inhibition of the formation of gas hydrate in streams which contain low boiling hydrocarbons and water, these streams being displaced throughout a conduit or pipeline. The process comprises adding to the stream a nitrogen component in a sufficient amount to inhibit the formation of gas hydrates in the mixture at the temperature and pressure found in the conduit.

U.S. Pat. No. 5,232,292 teaches a process for the control of clathrate hydrates in fluid systems, the hydrates hindering the flow of fluid in a fluid system. The process comprises the contact of an additive with the clathrate mass. Preferably, the additive contains a cyclic chemical group having five, six and/or seven members. The additives include a poly(N-vinyl lactam) having molecular weight higher than 40,000, the polymer comprising a backbone, a first cyclic chemical grouping which extends from the backbone, and a second cyclic grouping extending from the backbone, the first cyclic grouping comprising a nonaromatic five-member organic heterocyclic ring having an internal amide, the second cyclic chemical grouping comprising a nonaromatic seven member organic heterocyclic ring having an internal amide, the polymer comprising a non-cyclic chemical group extending from the backbone. Representative polymers are N-vinyl pyrrolidone and hydroxyethyl cellulose, used alone or in combination.

U.S. Pat. No. 5,244,878 teaches a process for delaying and/or reducing the agglomeration tendency of hydrates in conditions under which a hydrate may be formed, which comprises adding to the hydrate-forming stream of gas and water an amphiphilic non-ionic compound chosen among the group of polyol esters and substituted or non-substituted carboxylic acids. The amphiphilic compound may be also an anionic amphiphilic compound.

U.S. Pat. No. 5,076,364 teaches a process for preventing gas hydrate formation in a gas well by injecting a carrier and an alcohol such as glycerol or a glycerol derivative into the well and connected facilities/pipelines.

U.S. Pat. No. 4,856,593 teaches, in a process for flowing through a pipeline a wet gas stream from an offshore producing well to shore under conditions of temperature and pressure conducive to the formation of gas hydrates, an improvement which comprises introducing in the wet gas stream a surface active agent of the group of organic phosphonates, phosphate esters, phosphonic acids, salts and esters of phosphonic acid, inorganic polyphosphates, esters of inorganic polyphosphates, polyacrylamides and polyacrylates in a sufficient amount to prevent stoppage of the flowing stream.

However, the control of gas hydrate formation by means of additives may be costly and of reduced efficacy.

On the other hand, the use of nitrogen gas and heat for various applications is well-known.

U.S. Pat. No. 4,846,277, of the Applicant and hereby fully incorporated as reference, teaches a continuous process for the hydraulic fracturing of a well with in situ nitrogen foam generation from the exothermic reaction between nitrogen inorganic salts, chiefly ammonium chloride and sodium nitrite, in the presence of a buffer which is able to keep the pH solution at 5.0 or less, and a viscosifying compound which may be any hydrosoluble polymer or gel which is able to increase the effective viscosity of the generated foam. The buffer system may be acetic acid at concentrations of from 0.5 volume % and the viscosifying compound is preferably hydroxyethyl cellulose (HEC). The polymeric viscosifier shows various advantages relative to the usual surface agents, since those may alter the rock wettability, emulsify when contacted with oil or precipitate if incompatible with the formation water. Further, the amount of polymeric viscosifier is less than that of surface agent for the same viscosifying degree.

U.S. Pat. No. 5,183,581 of the Applicant and hereby fully incorporated as reference, teaches a process for the dewaxing of producing formations based on a Nitrogen Generating System/Emulsion designed for the dewaxing of producing formations with the aid of nitrogen gas and heat generated by the reaction between aqueous solutions of nitrogen inorganic salts in the presence of an emulsified organic solvent. Paraffin deposits are typically made up of preferably linear, saturated hydrocarbon chains in $C_{16}$ to $C_{80}$ in admixture with branched hydrocarbons, asphaltenes, water and various mineral substances. The deposition phenomenon or precipitation of solid wax is an example of fluid/solid phase equilibrim, which can be explained in the light of principles of solution thermodynamics, that is, the solution of a hydrocarbon of higher molecular weight in hydrocarbons of lower molecular weight which function as solvents. That is, high molecular weight solids precipitate whenever the transport ability of the compound which works as solvent for the fluid is reduced.

U.S. Pat. No. 5,580,391 of the Applicant and hereby fully incorporated as reference teaches a process for the thermochemical cleaning of storage tanks which contain sludges from petroleum oil or related products. The process is carried out by the combined action of an organic solvent and the generation of nitrogen gas and heat, whereby is produced heating in situ, agitation by turbulence and flotation of the fluidized sludge, which after being collected and transferred to tanks or desalting units can be reintroduced in the usual refining flow.

U.S. Pat. No. 5,539,313 of the Applicant and hereby fully incorporated as reference teaches a process for the thermochemical dewaxing of hydrocarbon transmission conduits, which comprises treating the wax-containing conduit with a water-in-oil emulsion, co-currently to the production flow. The emulsion contains inorganic reactants which generate nitrogen and heat, which fluidize the paraffin deposit which is later driven off by cleaning beds.

The literature thus indicates on the one hand efforts for fluidize the gas hydrates by incorporating an additive to the oil or gas stream so as to alter the thermo-dynamic conditions of hydrate formation. On the other hand, the Applicant has developed a nitrogen and heat-generating treating fluid—the SGN fluid—which, by generating nitrogen and heat can possibly alter the thermo-hydraulic hydrate-forming conditions so as to prevent the formation or dissolve the hydrates which may form in producing wells, injection wells or reservoirs, as well as those formed in gas conduits submitted to conditions of hydrate formation.

SUMMARY OF THE INVENTION

The present invention relates to a process for the thermo-hydraulic control of gas hydrates which may form from hydrocarbon gases of low boiling point, for example hydrocarbons in $C_1$–$C_7$ brought into contact with water, under thermo-hydraulic conditions conducive to hydrate formation, wherein a foamed fluid based on an aqueous solution of nitrogen salts designed to generate nitrogen and heat, the aqueous solution being viscosified with the aid of high-molecular weight, non-ionic cellulose polymer, is made to contact the hydrate in order to dissolve it. In situ foam generation with simultaneous release of heat and lowering of hydrostatic pressure of the system alters the thermo-hydraulic conditions to which the hydrate is submitted, providing for the dissolution or dissociation of the hydrate into water and gas.

Under somehow different conditions for the control of gas hydrates there is no need to viscosify the SGN system, it being then applied as a nitrogen- and heat-generating solution.

The basic concept of the present invention comprises the in situ generation of foam with simultaneous release of heat and/or hydrostatic pressure reduction of fluid-containing pipes whereby the thermo-hydraulic conditions to which the hydrate is submitted are altered, so as to prevent the formation of, or dissolve the hydrate in its constituents, that is, water and gas.

The process of the present invention for the thermo-hydraulic control of gas hydrate formation in a producing well comprises, for the SGN/Foam mode, the following steps:

a) based on kinetic reaction studies, determining the concentration of nitrogen salts necessary to prepare the nitrogen- and heat-generating solution to be contacted with the gas hydrate:

b) preparing in one single vessel an equimolar aqueous solution of ammonium chloride and sodium nitrite of concentration between 2.0 and 4.5 molar determined according to step a);

c) viscosifying the salt solution of b) with hydroxyethyl cellulose at a concentration between 0.3 to 1.2% weight/volume keeping the pH between 8.0 and 8.3;

d) separately preparing a solution of acetic acid activator at 40% volume;

e) adding between 1 and 2 volume % of activator of step d) to the viscosified aqueous solution so as to generate nitrogen gas fluid foamed and viscosified;

f) pumping the foamed and viscosified nitrogen- and heat-generating fluid of step e) through a flexitube to as to contact the foamed and viscosified fluid with the gas hydrate and dissolve the gas hydrate by the increase in temperature and pressure reduction;

g) recovering the spent fluids and separating the aqueous phase in a separator.

In the SGN/Solution mode, the treating fluid comprises a solution of the nitrogen- and heat-generating salts added only of the necessary amount of acetic acid and injected into a well submitted to a Water Alternating Gas working.

In pipelines which transport light hydrocarbons where a wet stream is under hydrate-forming conditions the SGN/ Solution treating fluid is injected through the pipeline or conduit, the contact of the treating fluid and the flowing fluid altering the hydrate-forming thermo-hydraulic conditions so as to dissolve the hydrates and restore flow within the pipeline.

Therefore, the present invention provides for a Nitrogen Generating System for the thermo-hydraulic control of gas hydrates formed during petroleum oil production from subsea wells, mainly deep-water wells.

The present invention provides further for a Nitrogen Generating System for preventing the formation of gas hydrates during water injection in subsea wells.

Also, the present invention provides for a Nitrogen Generating System for the thermo-hydraulic control of gas hydrates formed in conduits or pipelines which transport petroleum fluids from offshore to shore installations.

The present invention contemplates further the control of gas hydrates formed from light hydrocarbon gases such as natural gas and water, under conditions which favor the formation of hydrates, the hydrocarbon gases being transported in conduits or pipelines.

Therefore the present invention provides for a process based on Nitrogen Generating System for the thermo-hydraulic control of gas hydrates formed under thermo-hydraulic conditions which favor the formation of gas hydrates, these being formed from $C_1$–$C_7$ hydrocarbon gases and water, these hydrates occurring during production, injection or transport operations of petroleum fluids as well as in operations related to natural gas.

The present invention provides for a process for the control of gas hydrates already formed or whose potential formation is indicated in view of the combination of thermo-hydraulic conditions which favor the building up of these hydrates.

The present process, such as described and claimed in the present application, is not described nor suggested in the literature.

DETAILED DESCRIPTION—PREFERRED MODES

In the present specification, the expression "gas hydrate control" means either the dissolution of the gas hydrate plugs already formed or the prevention of their formation.

According to the SGN method, the nitrogen and heat generation is effected by the reaction of nitrite and ammonium ions present in an aqueous solution of these salts, from which are obtained nitrogen gas and heat. The nitrogen- and heat-generating aqueous solution contains: a) a compound which contains at least one atom of nitrogen to which is linked at least one hydrogen atom, such compound being able of being quick and exothermically oxidized, in an acid aqueous solution, so as to yield heat, nitrogen gas and by-products which are liquid or dissolved, while substantially inert to the well or to any equipment which these products may be contacted; b) at least one oxidizing agent able to oxidize the nitrogen compound of a); c) a buffer system able to keep the solution pH at a level around 5.0 or less. Such as applied in the present invention, the reaction system may further comprise a viscosifying agent which may be any hydrosoluble polymer or gel which is able to increase the effective viscosity of the generated foam.

In other applications, SGN may be applied solely as an aqueous solution, without the addition of any viscosifying nor surface active agent.

In spite of the fact that various oxidation-reduction couples may be used for preparing the nitrogen- and heat-generating aqueous solution of the present invention, such as urea-sodium hypochlorite, urea-sodium nitrite, ammonium chloride and sodium hypochlorite or ammonium chloride-sodium nitrite, this last one is the preferred couple to be used in the present process for the thermo-hydraulic control of gas hydrates. The choice of this particular couple is due to the fact that only this couple provides for the easy reaction control, high exothermicity, sensitivity to the medium pH, besides yielding non-corroding by-products.

The buffering system c) consists of an aqueous solution of acetic acid 40% vol/vol (or more) and the viscosifying agent, whenever employed, is preferably high-molecular weight hydroxyethyl cellulose (HEC) which works secondarily as a surface active agent. One of the advantages of using HEC is that this compound promotes higher viscosity of the foam on a weight basis of a corresponding surface active agent. Also, the stability of the foam is improved when using HEC.

The water used in making the nitrogen salts solution may be any good quality industrial water, the pH being in the range of 6 to 8. Preferably, the water is free of ferric ions The reaction between the nitrogen generating compounds comprises the steps of reagent dissolution, $NH_4^+NO_2^-$ complex formation and further conversion of the complex into nitrogen gas and water. The rate of the decomposition reaction may be subjected to variations in the case where the acid hydrogen species ($H^+$) is introduced in the medium. Therefore the equation which describes the reaction rate depends on the concentration of ammonium, nitrite and acid hydrogen ions. Other important parameters such as temperature, agitation and viscosity are associated to the degree of proximity of the chemical species nitrite and ammonium in the complex formation. On the other hand, pressure, temperature and solubility regulate the state of the produced gas (PVT).

The reaction of nitrogen generation indicates an equimolar stoichiometry between ammonium chloride and sodium nitrite. Normally the molarity will be between 0.5 and 4.5.

The pH influences the reaction rate, since the reaction mechanism comprises the effect of the hydrogen ion $H^+$ in the activated complex step. Optimum pH values are between 4.75 and 5.50.

The viscosity of the medium affets the reaction rate: the higher the viscosity, the longer the reaction life time.

While the reagent dissolution is endothermal, the nitrogen generation is highly exothermic, with release of 70–75 kcal per mole of consumed reagent, the exothermicity being favorable to the control of gas hydrates, no matter the circumstances under which they have been formed: production well, injection well, reservoir or conduit.

The Nitrogen Generation System as applied in the present invention may comprise a heat- and nitrogen generating fluid viscosified with a non-ionic, high molecular weight polymer such as hydroxyethyl cellulose. This mode is then called SGN/Foam.

The Nitrogen Generating System may equally comprise a heat- and nitrogen generating fluid in solution. This mode is then called SGN/Solution.

SGN/Foam Mode

This mode for the control of gas hydrates is mainly applied to the removal of already formed gas hydrates, for example in a producing well. However this mode may equally be applied to prevent the formation of gas hydrate plugs.

Figure 1:
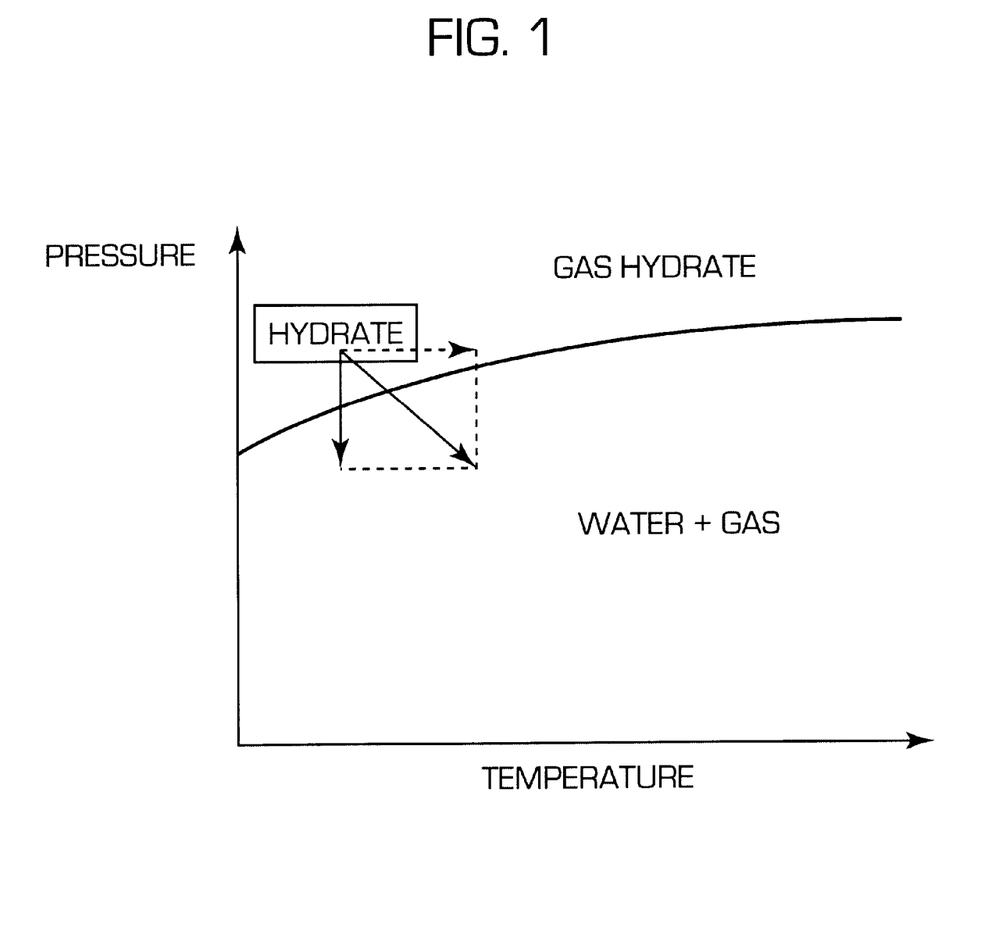
FIG. 1 is a phase diagram of the gas hydrate submitted to SGN/Foam.

FIG. 1 attached is a phase diagram illustrating the displacement of the gas hydrate to the water+gas phase. Under conditions of high pressure and low temperature, the water+gas constituents form hydrate plugs. By applying the SGN/Foam treatment pressure is reduced and temperature is increased so that the hydrate constituents return to the water+gas condition.

It is well known that as production goes on in a subsea producing well, dead oil is separated from gas. When water injection is initiated, and in the presence of the low subsea temperatures, the thermo-hydraulic conditions for forming hydrate plugs are established, and oil production may be hindered.

The mode of the present invention which makes use of the heat- and nitrogen generating fluid viscosified with a non-ionic polymer employs the SGN/Foam fluid. Applying this process for example to an occurrence of gas hydrates for example near a Wet Christmas Tree (WCT) basically comprises pumping a minimum amount of SGN fluid previously viscosified with a polymer such as high molecular weight hydroxyethyl cellulose (HEC) and activated on flow, the fluid being injected through a flexitube the end of which is positioned immediately above the top of the hydrate plug, so as to promote intense foam generation on such plug.

The application of the SGN/Foam technology to a petroleum producing field is normally preceded by the assessment of the reaction kinetics at the laboratory scale. Then the obtained data are fed to a numerical simulator which will design the field operation procedure from data of composition, volume and flowrate of the SGN/Foam fluid.

Figure 2:
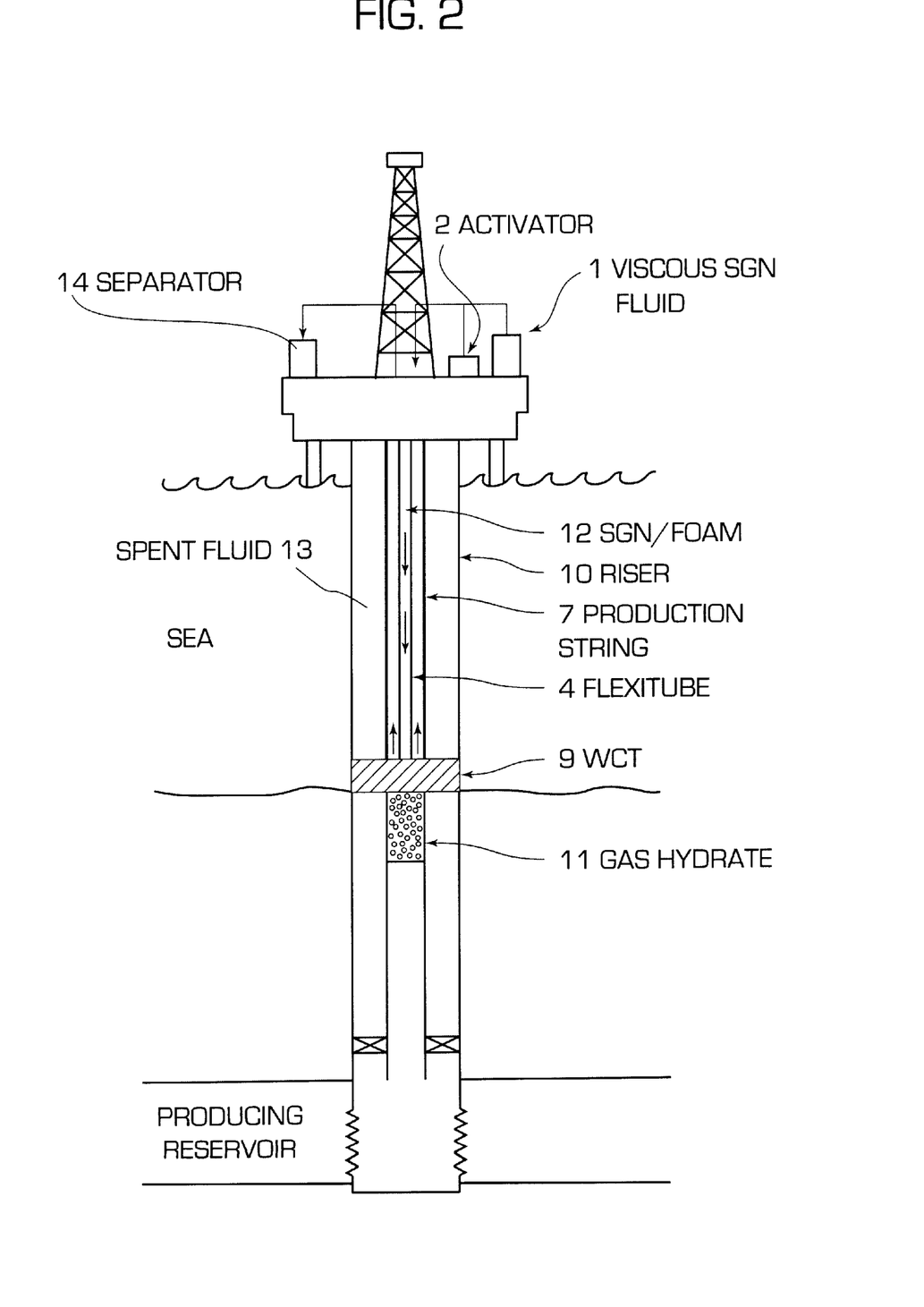
FIG. 2 is a simplified flowsheet of the mode of the present invention designed for the thermo-hydraulic control of gas hydrates by means of SGN/Foam.

FIG. 2 attached illustrates the basic scheme of the pumping and circulation operation of SGN/Foam for a subsea production well in its completion or intervention step. At this step the completion fluid is within production string (7) in order to control the hydrostatic pressure of the well. Under the condition of application of the SGN/Foam fluid there is no flow of oil since the hydrate plug avoids the flow of oil. Concerning its localization, according to FIG. 2, the gas hydrate may form in the surroundings of, that is, above or below the WCT due to the sudden reduction in temperature as a function of the low temperatures of the seabottom. On FIG. 2 are shown the production string (7), a flexible conduit or flexitube (4), a Wet Christmas Tree (9), riser (10) and the gas hydrate (11) formed.

The nitrogen- and heat generating solution designed to work on the hydrate blocks or plugs is prepared from an aqueous solution of $NH_4Cl$ and $NaNO_2$ salts in equimolar amounts. The solution is viscosified with the aid of high molecular weight hydroxyethyl cellulose (HEC). The thus obtained viscosified fluid SGN (1) is mixed on flow to the activator (2) so as to yield the activated, viscosified SGN/Foam fluid (12) which is injected through the flexitube (4) at the previously established concentration which has been determined based on kinetic studies.

The activated, viscosified SGN/Foam fluid (12) triggers the foam generation on flow throughout and up to the lower end of the flexitube (4), eventually reaching the region of probable formation of hydrate (11). As a consequence of the released heat and fluid expansion caused by the SGN/Foam fluid the hydrostatic pressure of the riser (10) is reduced, the aqueous completion fluid and foamed fluid being recovered. The increased temperature and reduced pressure resulting from the SGN/Foam fluid alter the temperature and pressure conditions which made possible the existence of a hydrate plug or block so that such plug tends to be converted into dissociated water and gas. After the injection of the SGN/Foam fluid oil production should be resumed shortly, between 30 and 60 minutes, so as to avoid the cooling of the components of the dissolved hydrate.

On meeting the possible gas hydrate plug (11) the SGN/Foam fluid (12) works according to three different ways:

i) it generates heat through the reaction between the nitrogen salts, $NH_4Cl$ and $NaNO_2$, so as to displace the balance of the phase diagram to the situation water+gas;

ii) it reduces the hydrostatic pressure by forming a low-density foam;

iii) the formed foam mechanically removes hydrate portions

This way the thermo-hydraulic conditions which favor the formation of hydrate plugs or blocks are modified, the plugs or blocks being dissociated into water and gas so that eventually the SGN fluid makes that petroleum oil production is resumed.

As a result of the action or treatment with SGN/Foam fluid there is obtained a spent fluid (13). The spent fluid (13) may be recovered through two different ways:

i) through the production string (7) itself;

ii) through the space existing between the production string (7) and the riser (10).

The spent fluid (13) is directed to the oil/gas triphase separator (14) where the aqueous phase is separated from the oil phase.

One additional advantage of the present process is that the lower pressure causes surgency to be induced, so that the well can reach complete flowrate values more rapidly than it would without injection of the SGN/Foam fluid.

Further, the spent fluid of the SGN/Foam fluid contains salts which render more difficult that gas hydrate blocks be formed again.

As described hereinbefore, the solution of heat- and nitrogen gas generation salts is normally constituted by ammonium chloride and sodium nitrite, the so-called "C+N solution", which is to be prepared in one single vessel. In order to obtain a foam of excellent stability, the recommended concentration for the nitrogen reactants in the SGN/Foam mode may vary between wide limits, but preferably is between 2.0 and 4.5 molar with 3.0 molar being a preferred concentration for each of the nitrogen salts.

The aqueous solutions which make up the fluid for the gas hydrate control are viscosified with high molecular weight hydroxyethyl cellulose (HEC) in concentration of 0.3 to 1.2 weight/volume. After adding the viscosifying agent HEC, the pH of the solution is permanently adjusted to values between 7.4 and 7.7, preferably 7.5, with the aid of a 50 wt % aqueous solution of sodium hydroxide.

The preparation of the C+N solution comprises, in a typical case:

| | |
|---|---|
| Volume of industrial water | 0.730 m³/m³ |
| $NaNO_2$ Concentration | 207.0 kg/m³ |
| $NH_4Cl$ Concentration | 160.5 kg/m³ |
| Concentration of C + N solution | 3.0 mol/l |
| pH of the C + N solution (adjusted) | 7.5 @ 25° C. |
| density of the C + N solution | 1.15 g/ml @ 25° C. |
| viscosity of the C + N solution | 1.3 cP @ 25° C. |

The thus prepared solution is viscosified with a polymeric viscosifying agent such as hydroxyethyl cellulose HEC. The viscosifying agent is added to the C+N solution under moderate agitation at a concentration of 80 lb/gal (9.6 grams/liter), followed by pH adjustment to values between 8.0 and 8.3 with the aid of NaOH solution at 50 wt %. For this polymer, the hydration period is estimated between 2 and 3 hours. The features of the final solution are as follows:

| | |
|---|---|
| HEC concentration | 9.6 kg/m³ |
| Volume of NaOH solution at 50 wt % | 2.0 liters/m³ |
| Apparent viscosity | 194 cP @ 510 s⁻¹ |
| Behavior Index | 0.28 |
| Consistency Index | 154 dyn. $s^n/cm^2$ |
| final pH of viscosified C + N solution | 8.2 @ 25° C. |
| density of viscosified C + N solution | 1.15 g/ml @ 25° C. |

The kinetics of the heat- and nitrogen generation reaction in the presence of foam has been determined in the labscale based on the follow-up of foam generation in a gauged cylinder, under ambient conditions and moderate magnetic agitation, pH, temperature and volume of foam being simultaneously measured. The C+N solution is viscosified with HEC at a concentration of 80 lb/gal (9.6 grams/liter or 9.6 kg/m³); the addition of activator has been effected immediately after the transfer of the fluid to the gauged cylinder.

TABLE 1

| Time (min) | pH (−) | Temperature (° C.) | Volume[a] (ml) | Yield[b] (% vol) | Quality[c] (ml/100 ml) |
|---|---|---|---|---|---|
| 0 | 5.1 | 21 | 50 | 0 | 0 |
| 2 | 5.0 | 27 | 400 | 12 | 0.875 |
| 4 | 4.9 | 32 | 780 | 23 | 0.936 |
| 6 | 5.0 | 34 | 1050 | 31 | 0.952 |
| 8 | 5.0 | 35 | 1150 | 34 | 0.956 |
| 10 | 5.0 | 35 | 1250 | 37 | 0.960 |
| 14 | 5.1 | 36 | 1380 | 41 | 0.964 |
| 18 | 5.2 | 36 | 1420 | 43 | 0.965 |

TABLE 2

| Time (min) | pH (−) | Temperature (° C.) | Volume[a] (ml) | Yield[b] (% vol) | Quality[c] (ml/100 ml) |
|---|---|---|---|---|---|
| 0 | 4.9 | 23 | 50 | 0 | 0 |
| 2 | 4.5 | 39 | 1100 | 32 | 0.954 |
| 4 | 4.8 | 47 | 1950 | 58 | 0.974 |
| 6 | 5.1 | 52 | 2050 | 61 | 0.975 |
| 8 | 5.1 | 54 | 2100 | 62 | 0.976 |
| 10 | 5.2 | 56 | 2150 | 64 | 0.977 |
| 14 | 5.2 | 56 | 2200 | 65 | 0.977 |
| 18 | 5.2 | 55 | 2250 | 67 | 0.978 | a) volume of foam under the test conditions corresponding to an initial SGN/Foam volume of 50 ml b) Yield of the reaction of nitrogen gas assuming total incorporation of the generated gas into the volume of foam c) Quality of foam as calculated from the equation $$\Gamma = \frac{\mathrm{Vol}_{foam} - \mathrm{Vol}_{liquid}}{\mathrm{Vol}_{foam}}$$

wherein Γ is the quality of the foam.

The viability of the present process for the thermo-hydraulic control of gas hydrates via SGN/Foam is checked by means of a physical simulation of the generation and circulation of foam. For such, a labscale physical simulator is assembled according to FIG. 3.

Figure 3:
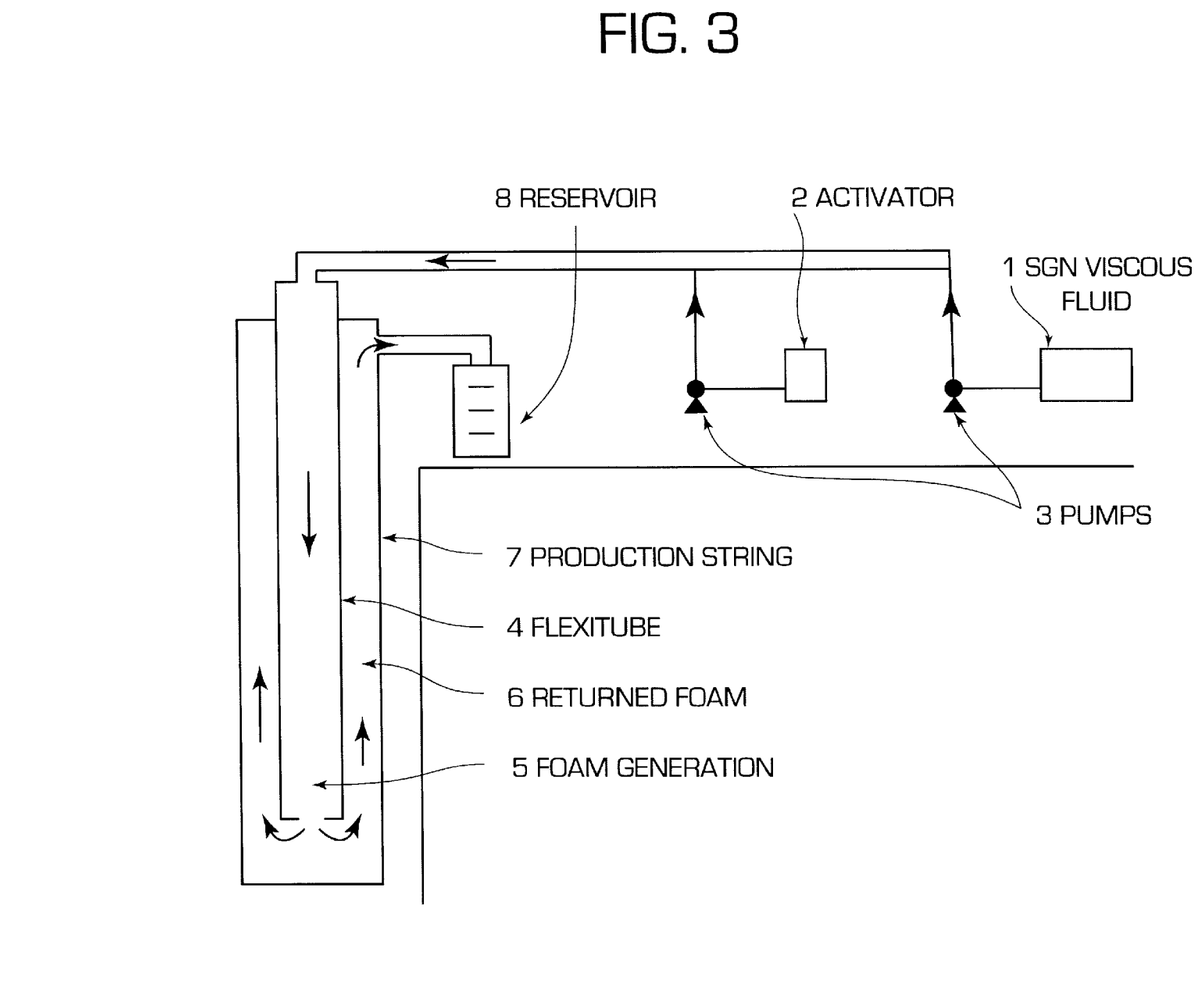
FIG. 3 is a schematic illustration of the labscale physical simulator used for simulating the in situ foam generation according to the present invention.

Basically, the physical simulator comprises two long, glass tubes which are concentrically positioned. The operation of the physical simulator is as follows:

The viscosified SGN fluid (1) as described hereinbefore is pumped at constant rate with a varistaltic pump and at the same time activator (2) is pumped through the same line, at a certain ratio of activator (2) to viscosified SGN fluid (1). The activated, viscosified fluid thus obtained is pumped by means of varistaltic pumps (3) throughout the flexitube (40) from which the fluid may, in a real field situation, contact the gas hydrate. In the physical simulator, the viscosified SGN fluid (1) reacts so as to generate a foam (5) and yield the necessary heat to displace, in the phase diagram, the hydrate to the water+gas phase. After the reaction is complete, the returned foam (6) is directed to the production string (7), and is collected in a proper vessel, a reservoir (8).

Additional devices such as flexible hoses and glass vessels are also part of the physical simulator. The pumping of the viscosified fluid and the activator is duly synchronized and the evolution of foam as well as the recovery of the original fluid contained in the simulator (for example, a completion fluid) are monitored during the test.

The features of the simulation test are as follows:

| | |
|---|---|
| Overall height of the simulator | 120 cm |
| Volumetric capacity | 2100 cm |
| Original fluid in the simulator | Water |
| Volume of SGN/Foam | 200 ml |
| Volume of activator (AcOH 50%) | 10 ml |
| Pumping rate | 100 ml/min |
| Return flowrate | 270 ml/min |
| Volume of recovered fluid | 1900 ml |
| Recovery of original fluid | 76% vol/vol |
| Volume of generated foam | 6300 ml |
| Yield of foam generation | 47% vol/vol |

The working of the labscale physical simulator demonstrates that a viscosified SGN fluid leads to heat and foam which are suitable to the control of gas hydrates in petroleum producing oils.

Therefore, the present process possesses the required characteristics which render it suitable to the control of gas hydrates formed in a production string pertaining to a subsea well.

The SGN/Foam fluid for the control of gas hydrates according to the thermo-hydraulic process of the present invention may be applied by means of a completion rig or a stimulating vessel. The control of the process is excellent, at the step of the C+N solution preparation as well as at the step of the simultaneous pumping of the SGN fluid and the activator with a chromatographic pump, it should be noted that the content of acetic acid used is different from that of other applications of SGN in view of the alkalinization of the nitrogen salts solution at the viscosification step of the C+N solution.

Also, the physical simulation tests for the process of in situ foam generation from previously viscosified SGN corroborate the technical viability of the inventive process, since they indicate more than 70% recovery of the original fluid. The high quality and stability fo the generated foam assures a significant pressure reduction of the hydraulic pressure in the production string. The step-by-step heat generation helps not only in dissociating the hydrate plug, but also in avoiding that it be re-formed later on.

SGN/Solution Mode

In situations such as in the technique of Water Alternating Gas (WAG) in subsea injection wells, it is common that the thermo-hydraulic combination for the formation of gas hydrates is satisfied. This is because the water injection combined to the low subsea temperatures and to the hydrocarbon gases favor the conditions to the build up of gas hydrate plugs.

In view of the frequent occurrence of gas hydrate plugs under such conditions, the control of such plugs may be preventively carried out using the treating fluid SGN/Solution, where the combination of heat, nitrogen gas and high salinity of the fluid prevent that gas hydrate plugs be formed.

For sure, the SGN/Solution fluid may also be used to dissolve already formed gas hydrate plugs.

Figure 4:
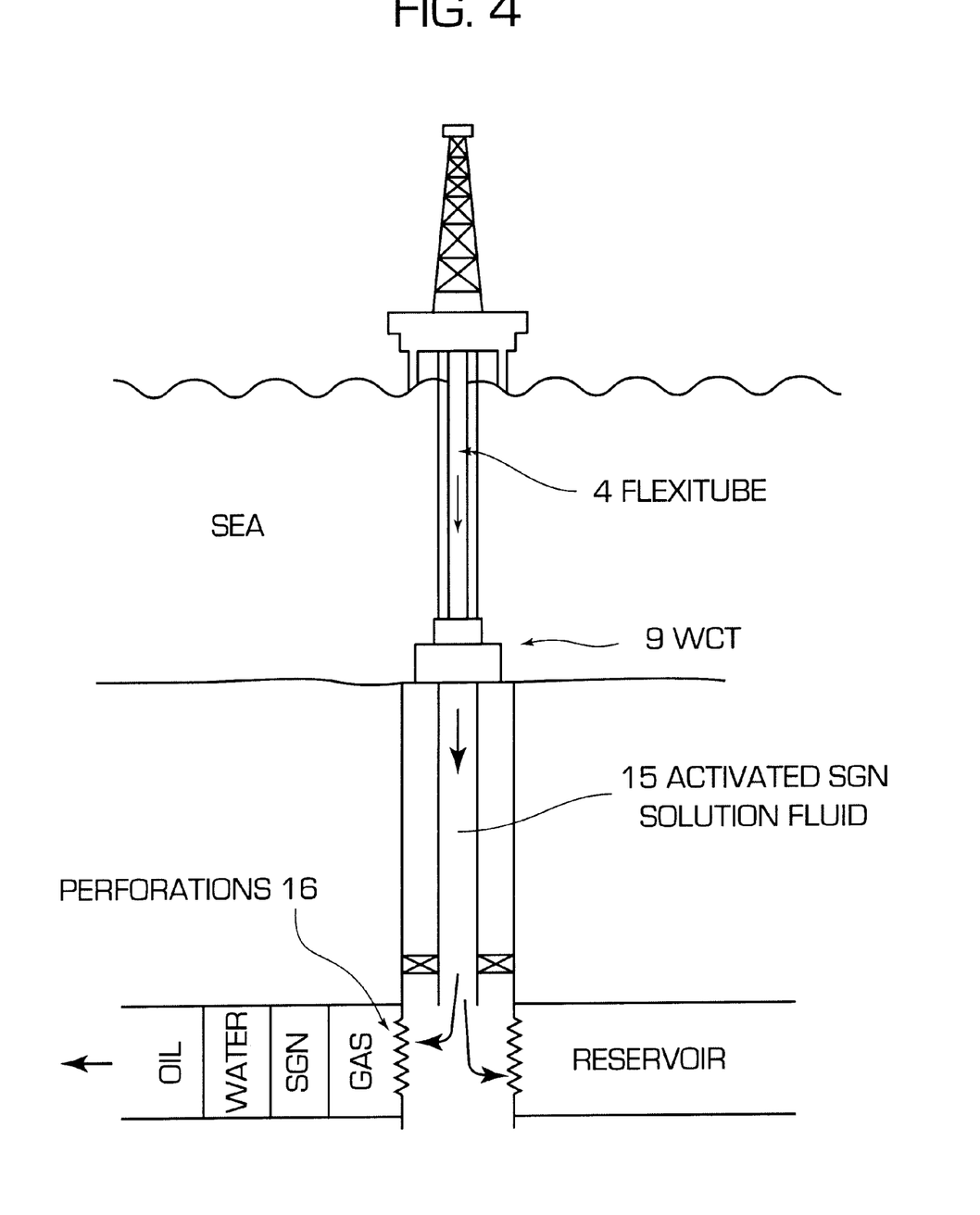
FIG. 4 is a simplified flowsheet of the mode of the present invention designed for the thermo-hydraulic control of gas hydrates by means of SGN/Solution.

A typical application of the SGN/Solution mode is illustrated in FIG. 4 which represents an injection well submitted to a WAG treatment which may generate the conditions for gas hydrate formation.

Broadly, the SGN/Solution treating fluid follows the step of water injection, is left to react and after a sufficient period of time, gas is injected according to the WAG system.

In this mode, the nitrogen salts-containing aqueous solution which will generate nitrogen gas and heat will be used without any other additive besides the activator. The aqueous solutions of molarity between 0.5 and 4.5 are prepared in one single mixing vessel, pumped with the aid of a triplex pump and activated on flow by means of acetic acid 0.4 to 1.2% vol/vol, for example 1.0% vol/vol added by means of a controlled-rate pump. From the flexitube (4) installed in the Wet Christmas Tree (WCT) (9) the activated SGN/Solution fluid (15) contacts the reservoir through the perforations (16), the fluid (15) entering then the reservoir and generating the required heat to prevent the formation of gas hydrate plugs. So, the SGN/Solution treating fluid creates new temperature conditions which are preventive to the formation of gas hydrate plugs, since under these temperature conditions the hydrate constituents water and gas keep in the dissolved state.

The SGN/Solution treating fluid is equally applicable to the formation of gas hydrate plugs in conduits or pipelines which transport hydrocarbons. These plugs may be formed whenever in a conduit which transports liquid hydrocarbons the gas phase separates from the liquid. Under conditions of high pressure and low temperatures, for example in subsea pipelines placed in cold waters, there is the possibility of hydrate formation.

Conduits transporting gases show the same possibility, any humidity present in the conduits being able to condense with the gases which are transported so as to form the gas hydrate plugs.

Numerical Simulation of the SGN/Solution Mode

Figure 5:
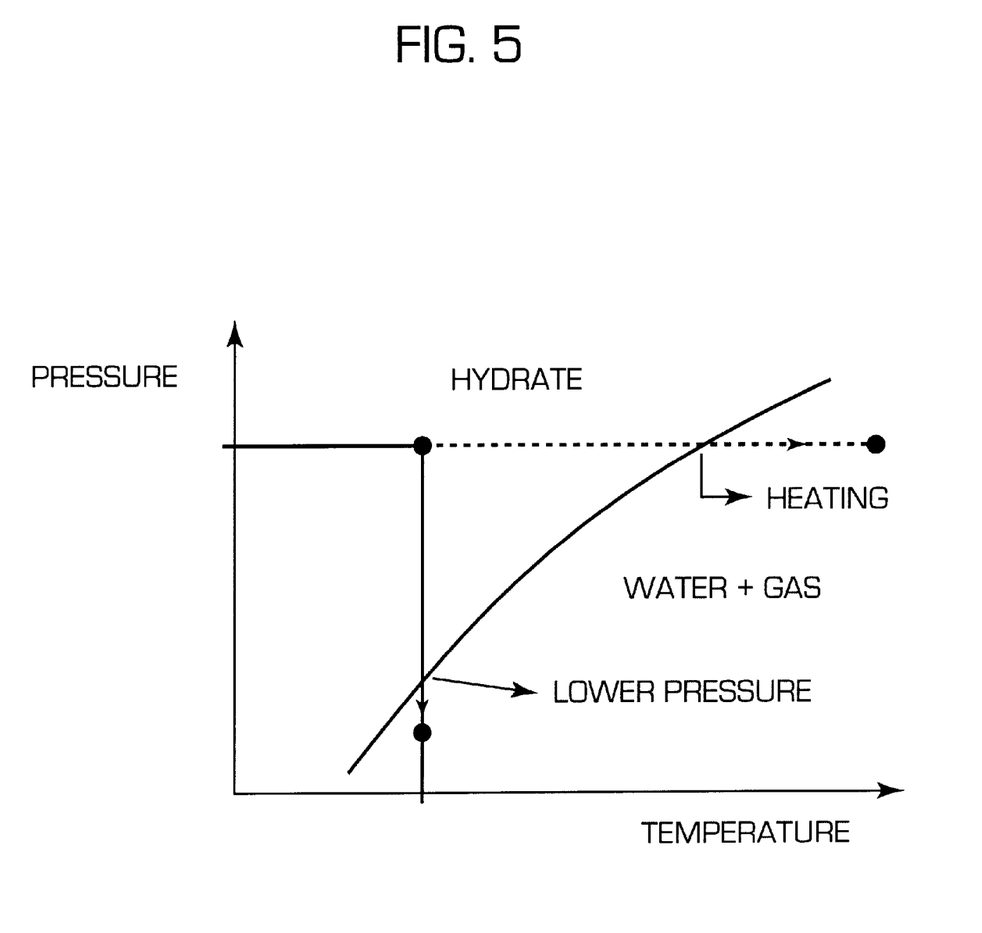
FIG. 5 is a phase diagram of a gas hydrate submitted to the SGN/Solution mode of the invention.

In an injection well under a water injection pressure of 280 kg/cm$^2$ (4000 psi) at temperatures of water injection around 10° C. in the penetration radius of the reservoir it is considered that the conditions for forming a gas hydrate in the well are met. The WAG technique is widely used in injection wells. When alternating water injection at low temperatures under relatively high pressures and gas, it is considered that the conditions for forming gas hydrates are practically met. It is a fact that under such thermo-hydraulic conditions the permoporous properties of the reservoir become impaired. As can be seen in the phase diagram of FIG. 5 the condition for the dissolution of the gas hydrate which may be formed must necessarily be obtained from an increase in temperature, since under such conditions pressure is a parameter difficult to be altered. Thus, the SGN/Solution treatment will be mainly directed to provide for the increase in temperature aimed at preventing the formation of, or dissolving any hydrates which might be formed in the injection well.

In order to obtain numerical data on an application of the SGN/Solution in an injection well a STAR software has been employed. In the area of secondary oil recovery, this software is a well-known thermodynamic simulator having a chemical-kinetic component. According to this software, once are defined the reservoir and the fluid to be injected into the reservoir, data are provided on the behavior of the injected fluid according to pre-set conditions.

The STAR simulator employs the concept of volume element or rock element, each element representing a vertical slice of the reservoir at a certain distance from the well. The elements are measured in feet. TABLE 3 below lists, for an injection well, the results for the simulation of the injection of a volume of 2,000 cubic meters of SGN/Solution fluid of concentration 0.9 mole/liter at a rate of 4.5 cubic meters/minute, for 7.5 hours. It is assumed that at a radial distance of 9 ft the influence of the possible formation of a gas hydrate does not impair the well infectivity. Therefore, with the use of the SGN/Solution fluid a condition should be attained where for the element situated radially 9 ft from the well, the temperature is higher than 20° C. at a pressure of 280° C., these the thermo-hydraulic conditions for the gas hydrate formation.

In TABLE 3 below, the expression "event" means:

i) the temperature situation after seawater injection is stopped. The temperature of the seawater is 10° C. which upon contact with the well temperature of 80–90° C. reaches 20° C.;

ii) the temperature situation after stopping the pumping of the SGN/Solution at 0.9 mole/liter (7.5 hours);

iii) the temperature situation after the soak time for working of the SGN/Solution fluid (2.5 hours soak time, the total treating time being 10 hours);

iv) continuous injection of natural gas: after the soak time natural gas injection is carried out during 1.5 day, the overall treating time being 48 hours or 2 days. The column indicating 36 hours and 48 hours from the beginning of the fluid treatment shows the condition of gas hydrate dissolution for the radial distance of 9 ft, since the temperature is than 20° C., a condition which does not allow the existence of gas hydrate plugs.

TABLE 3

| | | | Temperature (° C.) | | | | | |
|---|---|---|---|---|---|---|---|---|
| | | 0 h | 7.5 h | 10 h | 12 h | 24 h | 36 h | 48 h |
| | | | | event | | | | |
| Radial distance (ft) | original situation = end of sea water injection | end of pumping of SGN @ 0.9 Mol/l | ("soak time") | continued injection of natural gas | | | | |
| 2 | 20 | 84.4 | 79.4 | 79.4 | 79.0 | 76.1 | 74.4 | |
| 3 | 20 | 77.2 | 74.4 | 74.4 | 74.4 | 72.2 | 71.1 | |
| 4 | 20 | 63.3 | 62.7 | 63.3 | 64.0 | 65.0 | 65.0 | |
| 5 | 20 | 46.1 | 48.3 | 48.9 | 50.0 | 54.4 | 56.1 | |
| 6 | 20 | 32.8 | 35.0 | 36.1 | 37.2 | 42.7 | 45.5 | |
| 7 | 20 | 24.4 | 26.6 | 29.2 | 27.7 | 33.3 | 36.1 | |
| 8 | 20 | 21.1 | 22.2 | 22.2 | 22.8 | 26.1 | 28.9 | |
| 9 | 20 | 20.0 | 20.5 | 20.5 | 20.5 | 22.8 | 22.2 | |
| 10 | 20 | 19.4 | 20.0 | 20.0 | 20.0 | 21.1 | 20.0 | |

Data from TABLE 3 show that between 24 and 36 hours after the start of the SGN treatment it is possible to attain temperatures beyond the gas hydrate-forming temperatures at a radial distance of 9 ft in the injection well. Thus, the heat wave generated by the SGN/Solution treating fluid is transmitted in such a way throughout the injection well so that after a sufficient soak time the thermal conditions which would lead to the formation of gas hydrate plugs no longer exist so that the formation of such plugs is prevented.

In case the gas hydrate is already formed, the SGN/Solution fluid may easily remediate the thermal condition. Care should be taken regarding the control of the injection pressure of the SGN/Solution fluid since the presence of hydrate alters the reservoir permeability.

Therefore, the various modes of the treating fluid, that is, SGN/Foam and SGN/Solution represent a versatile tool for the preventive as well as the corrective treatment of the various conditions of formation of gas hydrate plugs, either in producing wells, injection wells or in pipelines which transport liquid or gaseous hydrocarbons.

We claim:

1. A process for the thermo-hydraulic control of gas hydrates under conditions of gas hydrate formation within a petroleum well, which comprises the following steps:

a) preparing in one single mixing vessel an aqueous, equimolar solution of ammonium chloride and sodium nitrite of concentration between 2.0 and 4.5 molar;

b) viscosifying the aqueous solution of step a) with hydroxyethyl cellulose of a concentration between 0.3 to 1.2 weight/volume keeping pH at values between 8.0 and 8.3;

c) in a separate vessel, preparing a solution of acetic acid activator of 40% volume;

d) adding between 1 and 2% volume of activator taken from said separate vessel to aqueous, viscosified solution taken from said one single mixing vessel so as to obtain a foamed and viscosified nitrogen gas fluid;

e) pumping the nitrogen gas- and heat-generating foamed and viscosified fluid of step d) through a flexitube positioned in the interior of the production string so as to contact said fluid with the gas hydrate and thus cause the gas hydrate to dissolve as a consequence of the increase in temperature and reduction of pressure;

f) recovering the spent fluids and separating the aqueous phase in an adequate separator.

2. A process according to claim 1, wherein the petroleum well is a production well.

3. A process according to claim 1, wherein the gas hydrate is formed above a Wet Christmas Tree of a petroleum production well.

4. A process according to claim 1, wherein the gas hydrate is formed below a Wet Christmas Tree of a petroleum production well.

5. A process according to claim 1, wherein the foamed and viscosified nitrogen gas fluid of step d) is formed in a pipeline attached to a petroleum explotation system.

6. A process according to claim 1, wherein the foamed and viscosified nitrogen gas fluid of step d) is formed in a pipeline for the transport of liquid fluids and gaseous fluids.

7. A process for the thermo-hydraulic control of gas hydrates under conditions of gas hydrate formation within a petroleum well, which comprises the following steps:
   a) preparing in one single mixing vessel an equimolar, aqueous solution of ammonium chloride and sodium nitrite of concentration between 0.5 and 4.5 molar;
   b) separately preparing a solution of acetic acid activator at 40% volume;
   c) adding between 1 and 2% volume of the activator of step c) to the aqueous solution of step a) so as to obtain a nitrogen- and heat-generating fluid in solution;
   d) through reservoir perforations, pumping the nitrogen- and heat-generating fluid of step c) to the interior of a reservoir so as to cause the heating of the reservoir;
   e) allow the nitrogen- and heat-generating fluid a sufficient soak time so as to prevent the formation of gas hydrate plugs as a consequence of the increase in temperature at the same time as natural gas is injected;
   f) withdraw the spent fluids.

8. A process according to claim 7, wherein in step e), the heating with the nitrogen- and heat generating fluid is also designed to dissolve an already formed gas hydrate.

9. A process according to claims 7 or 8, wherein the heating with the nitrogen- and heat-generating fluid is designed to control the gas hydrates in an injection petroleum well.

10. A process according to claims 7 or 8, wherein the heating with the nitrogen- and heat-generating fluid is effected in a petroleum reservoir.

11. A process according to claim 6, where said pipeline is a pipeline for the transport of fluids comprising petroleum oil.

12. A process according to claim 6, where said pipeline is a pipeline for the transport of fluids comprising light hydrocarbon gas.

* * * * *